United States Patent [19]

Wachi

[11] Patent Number: 4,466,089
[45] Date of Patent: Aug. 14, 1984

[54] INFORMATION SIGNAL REPRODUCING APPARATUS

[75] Inventor: Shigeaki Wachi, Kurume, Japan

[73] Assignee: Sony Corporation, Tokyo, Japan

[21] Appl. No.: 390,816

[22] Filed: Jun. 22, 1982

[30] Foreign Application Priority Data

Jun. 30, 1981 [JP] Japan .................................. 56-101691

[51] Int. Cl.³ .......................... G11B 17/00; G11B 5/00
[52] U.S. Cl. ......................................... 369/59; 360/32
[58] Field of Search ...................... 369/59; 360/32, 39, 360/40, 51

[56] References Cited

U.S. PATENT DOCUMENTS 4,338,683  7/1982  Furukawa et al. .................... 369/59

Primary Examiner—Vincent P. Canney
Attorney, Agent, or Firm—Lewis H. Eslinger; Alvin Sinderbrand

[57] ABSTRACT

An information signal reproducing apparatus for reproducing from a disc having recorded thereon a pulse code modulated (PCM) signal which is modulated in a run length limited code is disclosed, in which a reproduced signal is compared with a threshold voltage by a comparing circuit so as to be converted in waveform, a maximum or minimum transition interval of the signal with the waveform converted is detected, and a counter is used to control the threshold voltage in such a manner that a positive polarity part and a negative polarity part of the maximum or minimum transition interval will be equal to each other.

12 Claims, 17 Drawing Figures

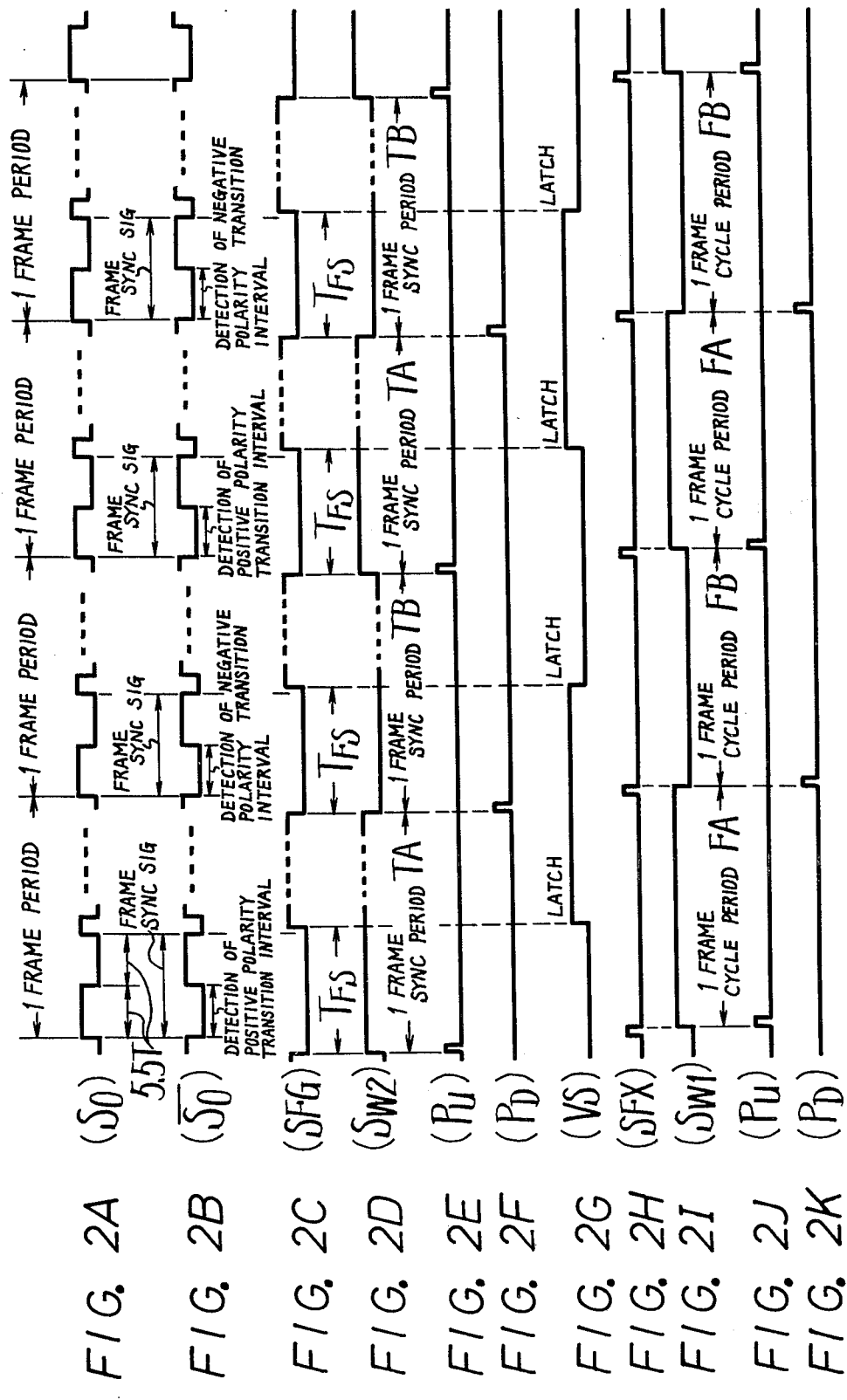

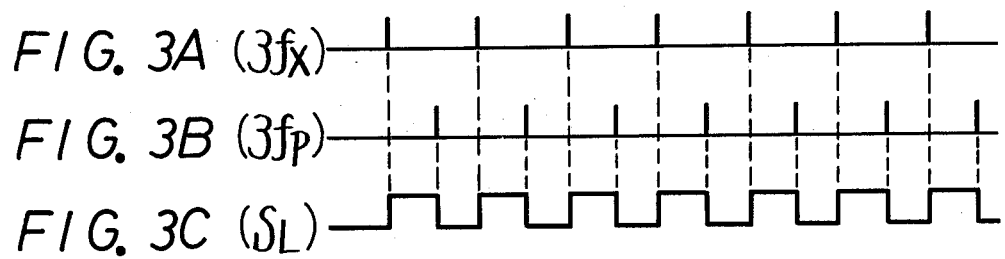
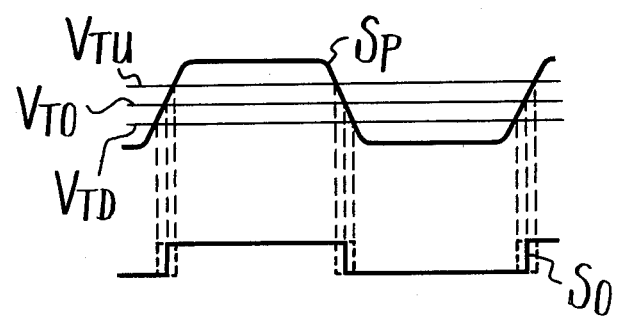
FIG. 4

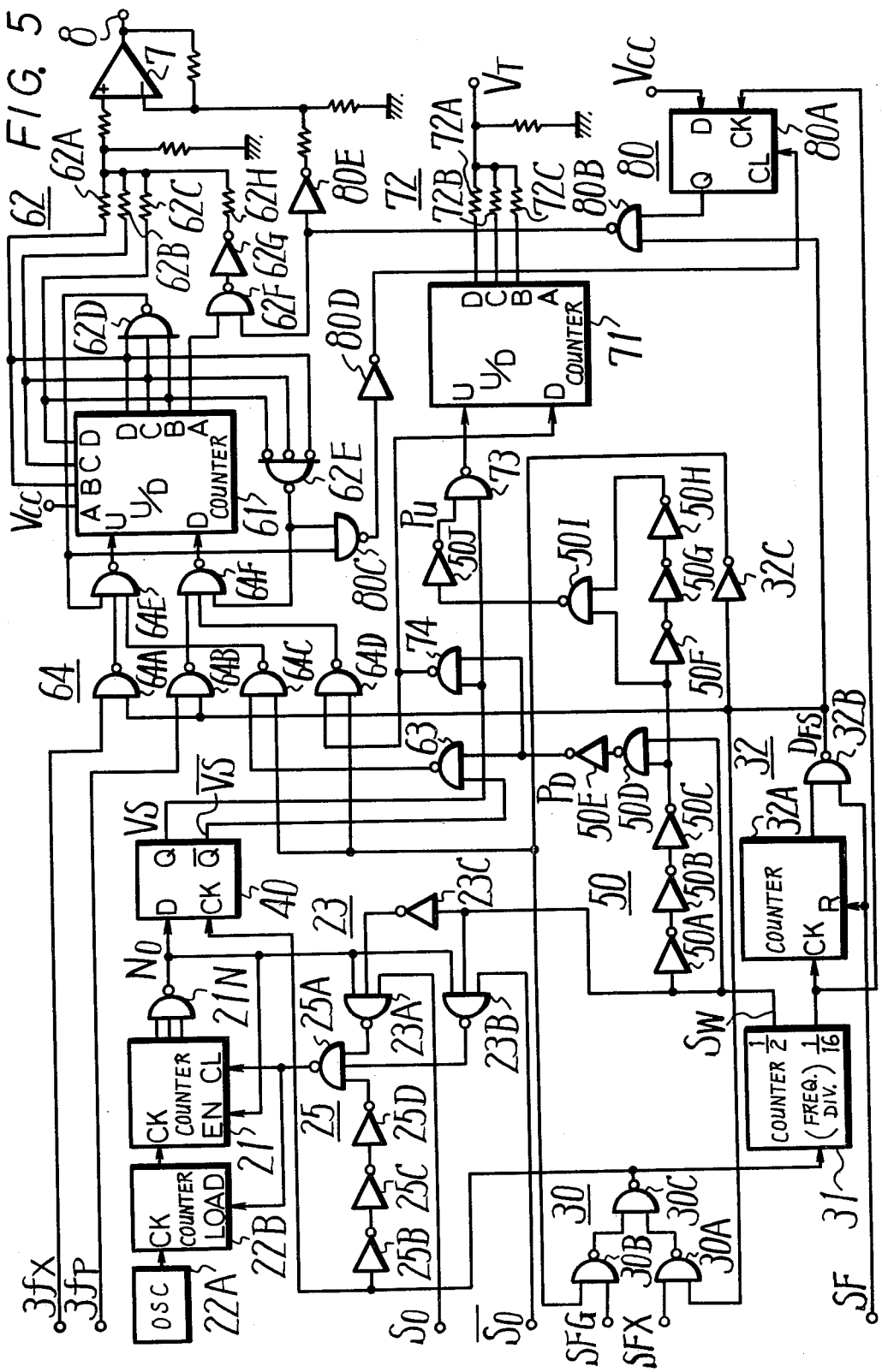

INFORMATION SIGNAL REPRODUCING APPARATUS

BACKGROUND OF THE INVENTION

1. Field of the Invention

The invention generally relates to an information signal reproducing apparatus for a disc record and more particularly, this invention relates to an information signal reproducing apparatus suitable to reproduce digital data recorded on the disc.

2. Description of the Prior Art

A disc is known on which an audio signal and other information signal which are digitized are recorded. By way of example, for the audio signal, such an optical disc is known on which the audio signal is pulse code modulated (PCM) and then recorded. By the way, to record a pulse code modulation (hereinafter simply referred to PCM) signal on the disc, a method of recording at a constant angular velocity and a method of recording at a constant linear velocity are proposed. In view of the increase of the recording density, the recording at the constant linear velocity is preferable. The disc on which the PCM signal is recorded at the constant linear velocity has to be reproduced at the constant linear velocity.

Such a method for controlling the disc rotation at the constant linear velocity upon playback is known that a position of a pick-up is detected by a potentiometer and since the necessary rotational number becomes the inverse number of such position, the detected output is supplied to a divider so as to obtain a control information. But, this method needs such an arrangement consisting of the position detector or potentiometer and the divider, so this leads to expensive and complex arrangement.

Therefore, in order to overcome the two defects as mentioned above, it is proposed to use the reproduced signal from the disc, without using the detector for detecting the position of the pick-up, so as to control the disc rotation at the constant linear velocity.

For instance, in a digital audio disc of an optical signal detection system, the optical disc is usually manufactured by the following processes stated below; a mastering process to form an original disc on which pits (recesses) corresponding to "1" or "0" of a recorded signal by the use of a laser beam optically modulated by the recorded signal; a process for duplicating the digital audio disc from this original disc by the method same as that of the normal analog disc. But, in this case, depending upon the condition of the mastering process and the like, the sizes of the pits are displaced or shifted uniformly by a predetermined amount so that a phenomenon where even when the ON/OFF ratio of the recorded signal is 50%, the ON/OFF ratio of the reproduced signal does not reach 50% (termed as asymmetry) will occur. In other words, when in a waveform converting circuit of a reproducing system, the reproduced signal is converted to the pulse signal, the pulse width thereof differs from that of the recorded signal. As a result, this causes such a problem that the processings of demodulating the reproduced data and so on will not be performed correctly. In the known reproducing apparatus, when the signal read out from the disc is supplied to a comparator used as a waveform converting circuit so as to be waveform-converted, a reference level for comparison (threshold level) is adjusted manually for the purpose of overcoming the aforesaid problems. Thus the adjusting operation is quite troublesome.

Moreover, when the audio signal is digitized, for example, converted to a PCM signal to be recorded, the audio signal is recorded at the base band system which is not a carrier modulation system such as amplitude and frequency modulations. In this case, a modulation method such as a run length limited code is used normally. This run length limited code modulation method is, with respect to data "0" or "1", a minimum transition interval $T_{min}$ between two data is extended to enhance the recording efficiency and a maximum transition interval $T_{max}$ therebetween is shortened to facilitate a self clock on a playback side.

Then, the deviation of the maximum or minimum transition interval from a reference value where the linear velocity is taken as a reference is detected and used as an information to correct or compensate for the velocity servo and the asymmetry.

In other words, the above correcting or compensating means includes a peak value holding circuit for deriving the maximum transition interval $T_{max}$ appearing successively twice from the signals reproduced from the disc and peak-holding the interval, another peak value holding circuit for inverting the above maximum transition interval $T_{max}$ and peak-holding therein the inverted signal, and a circuit for deriving a difference between the outputs of both the peak value holding circuits, in which the differential output mentioned above is employed as the signal to compensate for the asymmetry. Also, based upon a clock component contained in the signal reproduced from the disc, a PLL (phase locked loop) circuit is driven. The output of this PLL circuit and a clock from a reference clock oscillator are compared with one other to permit the motor driving to be controlled.

The method as described above has the control signal system formed in analog fashion so that it has a disadvantage that the accurate correction or compensation of the asymmetry or the accurate control of the motor velocity and phase is impossible.

OBJECTS AND SUMMARY OF THE INVENTION

Therefore, it is an object of the invention to provide an information signal reproducing apparatus which can correct or compensate for asymmetry in a reproduced signal by a digital technique.

It is another object of the invention to provide an information signal reproducing apparatus which can not only correct or compensate for asymmetry in a reproduced signal by a digital circuit but also provide a servo signal of a motor to rotate a disc.

It is a further object of the invention to provide an information signal reproducing apparatus in which a circuit arrangement can be simplified by making a circuit for detecting asymmetry in a reproduced signal and a circuit for producing a velocity control signal of a motor to rotate a disc common partially to each other.

According to an aspect of the invention, there is provided an information signal reproducing apparatus comprising:

a disc having recorded thereon an information signal which is modulated by a run length limited code;
means for reproducing said information signal from said disc;
a motor for rotating said disc;

a comparator for comparing a level of said reproduced information signal with a threshold voltage to produce a continued rectangular wave form signal;

a first detecting means for detecting an interval of a positive polarity part of a maximum or minimum transition interval in said rectangular wave form signal and an interval of a negative polarity part of the maximum or minimum transition interval in said rectangular wave form signal;

an up-down counter for counting a clock pulse in such a manner that the content is increased (reduced) when the interval of said positive polarity part is greater than a predetermined interval and that the content is reduced (increased) when the interval of said negative polarity part is greater than said predetermined interval;

a digital-to-analog (D/A) converter for converting a digital signal supplied from said up-down counter to an analog signal in response to a digital value; and means for supplying said analog signal to said comparator as said threshold voltage, thereby to produce a signal having equal intervals of positive and negative polarity parts of said maximum or minimum transition interval.

The other objects, features and advantages of the invention will become apparent from the following description taken in conjunction with the accompanying drawings through which the like references designate the same elements and parts.

BRIEF DESCRIPTION OF THE DRAWINGS

FIGS. 2A to 2K, FIGS. 3A to 3C and FIG. 4 are signal waveform diagrams each being used to explain the operation of the information signal reproducing apparatus in FIG. 1; and FIG. 5 is a circuit diagram showing the further detail of the block diagram of FIG. 1.

DESCRIPTION OF THE PREFERRED EMBODIMENT

Figure 1:
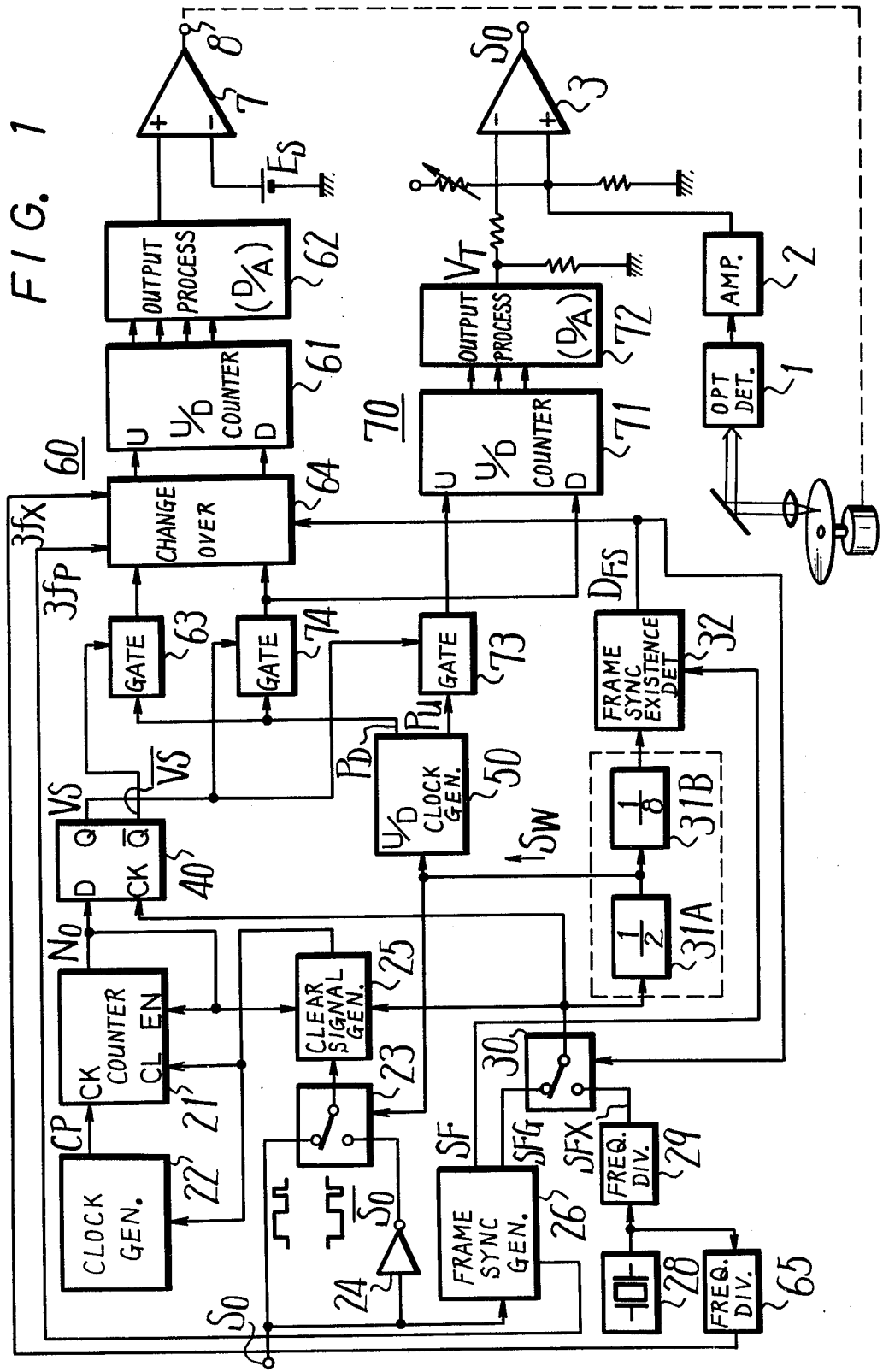
FIG. 1 is a block diagram showing an example of the information signal reproducing apparatus according to the invention.

Now, one embodiment of an information signal reproducing apparatus of the invention will hereinafter be described by way of example with reference to the drawings.

FIG. 1 shows an overall arrangement of the information signal reproducing apparatus according to the invention schematically.

In FIG. 1, reference letter D designates an optical disc on which, for example, an audio signal which is pulse code modulated (PCM) is recorded in a run length limited code modulation method. For the purpose of increasing a recording density, the PCM audio signal is also recorded on the disc D at a constant velocity. The run length limited code modulation method is so prepared that with respect to data "0" or "1", a minimum transition interval $T_{min}$ between two data is extended to enhance the recording efficiency and a maximum transition interval $T_{max}$ therebetween is shortened to make a self clock on the playback side easier.

Moreover, in this case, taking advantage of the fact that a modulated output where the maximum transition interval $T_{max}$ is continuous does not appear in the ordinary modulation, a bit pattern in which the maximum transition interval $T_{max}$ is successive twice, namely, appears as the interval of the positive and negative polarity parts is employed as a frame synchronizing (hereinafter, simply referred to sync) signal. Therefore, considering that the frame sync signal always appears during one frame period, the disc rotation is so controlled as to make the maximum transition interval $T_{max}$ equal to a reference value.

By way of example, the above maximum transition interval $T_{max}$ is given as 5.5 T (where T represents a bit cell period of input data to be recorded).

Also, reference 1 denotes an optical or photo detector to irradiate a light beam on the disc D, detect a reflected light on the disc D which is modulated by the recorded signals and convert the same to an electric signal. This optical detector 1 provides a reproduced PCM signal SP whose waveform is blunted in a substantially sine wave. This PCM signal SP is supplied through an amplifier 2 to a comparator 3, in which it is compared with a threshold voltage $V_T$, which will be stated later. Thus a rectangular waveform-shaped output signal $S_o$ corresponding to "1" or "0" of the recorded signal is developed from the comparator 3.

In the embodiment of this invention, whether or not the length of the maximum transition interval $T_{max}$ in the reproduced signal is set as a reference value, for example, 5.5 T is detected as follows. That is, a clock with a constant frequency higher than the bit frequency of the reproduced signal is prepared, the number of the clocks contained within the maximum transition interval $T_{max}$ of the signal $S_o$ is counted and then detected if the above number is equal to the number contained within the maximum transition interval $T_{max}$ when the maximum transition interval is 5.5 T, in other words, the linear velocity is a predetermined velocity.

In FIG. 1, reference 21 denotes a counter for detecting whether or not the maximum transition interval $T_{max}$ of the reproduced signal is 5.5 T, and reference 22 denotes a clock generator for generating a clock with a sufficiently higher frequency than the bit frequency of the reproduced signal. An output clock $C_p$ of the clock generator 22 is supplied to a clock terminal CK of the counter 21. The counter 21 is put into the clear state when a clear terminal CL thereof is supplied with the signal "0", while it is put into the count possible state to count the input clocks when the clear terminal CL thereof is supplied with the signal "1".

Reference 25 denotes a clear signal generator to generate and supply a clear signal to the counter 21. Reference 23 denotes a switching circuit, one of the input terminals of which is directly supplied with the output signal $S_o$ (FIG. 2A) derived from the comparator 3 and the other input terminal of which is supplied with signal $\overline{S_o}$ (FIG. 2B), wich is the output signal $S_o$ inverted in polarity by an inverter 24. The switching circuit 23 is alternately switched to its one or the other input terminal by a signal $S_w$, which will be mentioned later, at every period of one frame data (hereinafter simply referred to one frame sync period) or at each accurate one frame period. Therefore, the signals $S_o$ and $\overline{S_o}$ are derived one after another from the switching circuit 23 and supplied to the clear signal generator 25.

The above signal $S_o$ is also supplied to a frame sync signal detector 26 which includes a PLL (phase locked loop) circuit. In this case, after the disc D is once pulled into the constant linear velocity, the PLL circuit is synchronized with the clock component contained in the reproduced signal $S_p$. Based upon the clock derived from the above PLL circuit, the frame sync signal where the maximum transition interval $T_{max}$ of 5.5 T is successive twice is detected. The frame sync signal detector 26 generates a detecting output signal SF which becomes "1" when the frame sync signal is not detected and which becomes "0" when it is detected.

Since the frame sync signal is sometimes lost by a dropout or the like, it is arranged that the frame sync signal detector 26 provides a signal SFG (FIG. 2C) which is synchronized with the detecting signal SF and which recovers the lost signal portion of the signal SF due to the dropout. In this case, in the stationary state after the disc D is pulled into the constant linear velocity, the signal SFG contains an information indicating the position where the frame sync signal may exist, and as shown in FIG. 2C, this signal SFG is "0" during the interval of the frame sync signal and during a period $T_{FS}$ including a slight interval of the periods therearound.

The signal SFG from this frame sync signal detector 26 is supplied to one input terminal of a switching circuit 30.

On the other hand, an output signal of a quartz oscillator 28 is supplied to a frequency divider 29, from which a signal with a constant period equal to the period of the frame sync signal when the linear velocity is a predetermined value, namely, a signal SFX (FIG. 2H) of a frame period is derived and then supplied to other input terminal of the switching circuit 30.

In this case, as will be apparent from FIG. 2H, the SFX is the positive pulse signal with the small pulse width.

The switching circuit 30 is switched to the side of the frequency divider 29 until the disc D is pulled into the constant linear velocity, and its switching signal is obtained as follows. That is to say, the output signal of the switching circuit 30 is supplied to and divided in frequency into one-half by a frequency divider 31A and the frequency-divided output therefrom is further supplied to a frequency divider 31B, in which it is further frequency-divided into one-eight, that is, the output signal of the switching circuit 30 is frequency-divided totally into one-sixteenth and then supplied to a frame sync signal existence detector 32. This frame sync signal existence detector 32 is also supplied with the detecting signal SF from the frame sync signal detector 26, so as to produce an output signal $D_{FS}$ which becomes "0" when the frame sync signal is not detected over, for example, successive 16 frame periods, namely, the disc D is not yet pulled into the constant linear velocity and which becomes "1" when the frame sync signal is detected, namely, the disc D is pulled into the constant linear velocity. This output signal $D_{FS}$ is supplied as the switching control signal to the switching circuit 30 so that when the output signal $D_{FS}$ is "0", the switching circuit 30 is switched to the state opposite to the present state shown in the figure and when the output signal $D_{FS}$ is "1", it is in the present state shown in the figure, respectively.

Accordingly, when the disc D is not pulled into the constant linear velocity, the switching circuit 30 produces the output SFX supplied from the frequency divider 29, while when the disc D is pulled into the constant linear velocity and the frame sync signal is being detected stably, the switching circuit 30 provides the signal SFG.

The signal derived from the switching circuit 30 is supplied to the clear signal generator 25 and to the frequency divider 31A. Thus the frequency divider 31A produces a signal $S_w$ which repeats "1" and "0" alternately at each one frame period or at every one frame sync period. This signal $S_w$ is supplied to the switching circuit 23 as its switching control signal, whereby during the period where the signal $S_w$ is, for example, "1", the switching circuit 23 is switched to the present state shown in the figure, while during the period where the signal $S_w$ is "0", it is switched to the state opposite to the present state shown in the figure, respectively. Therefore, the signals $S_o$ and $\overline{S_o}$ are alternately derived from the switching circuit 23 at every one frame period or at each one frame sync period. The output signal of the switching circuit 23 is supplied to the clear signal generator 25.

The clear signal generator 25 produces the output signal of the switching circuit 23 during the period where the output signal of the switching circuit 30 is "0", and also produces the clear signal "0" during the period where the output of the switching circuit 3 is "1". This clear signal therefrom is supplied to the clear terminal CL of the counter 21.

As stated before, the counter 21 is in the clear state when the clear terminal CL thereof is supplied with the signal "0", while the counter 21 counts the input clock CP when the clear terminal CL thereof is supplied with the signal "1". Thus when the output signal of the switching circuit 30 is "0" and the signal $S_o$ or $\overline{S_o}$ is supplied to the clear terminal CL of the counter 21, during the interval of the signal $\overline{S_o}$, the input clock CP is counted by the counter 21 during the transition interval of the positive polarity, while during the interval of the signal $S_o$, the input clock CP is counted by the counter 21 during the transition interval of the negative polarity. In short, the number of the clocks CP contained within the transition intervals of the positive and negative polarities is counted by the counter 21.

When the output signal of the switching circuit 30 is "1", the signal supplied to the clear terminal CL of the counter 21 is "0" so that the counter 21 is put into the clear state. The position at which the output signal of the switching circuit 30 is changed over from "1" into "0" appears at each one frame period or at each one frame sync period so that the counter 21 is also cleared at every one frame period or at each one frame sync period.

In this case, since the switching circuit 23 provides the signals $S_o$ and $\overline{S_o}$ alternately at each one frame period or at each one frame sync period, the detections of the lengths of the transition intervals of the positive and negative polarities are both performed at every one frame period or at each one frame sync period in time sharing manner.

Within one frame period or one frame sync period, the counter 21 produces an output $N_o$ which becomes "0" if there exists any longer transition interval in the signal $S_o$ or the signal $\overline{S_o}$ where the number of the clocks CP is counted to be more, even by one clock, than the number of clocks CP contained within the maximum transition interval 5.5 long when the linear velocity of the disc D is a predetermined one, and which becomes "1" if not. When the output $N_o$ becomes "0", the counter 21 is put into the count disable state because the output $N_o$ is supplied an enable terminal of the counter 21, and since this output $N_o$ is supplied to the clear signal generator 25, the counter 21 is no longer cleared by the signal $S_o$ or the signal $\overline{S_o}$. This state is continued until the counter 21 is cleared by the signal SFX of the next frame period or the signal SFG of the frame sync period.

In other words, the output $N_o$ of the counter 21 is updated for every one frame period or at each one frame sync period.

The output $N_o$ of the counter 21 is supplied to a D terminal of a D flip-flop circuit 40. Also, by the rising edge of the signal SFX or SFG derived from the switching circuit 30 which is supplied to a terminal CK of the flip-flop 40, the output $N_o$ of the counter 21 is latched to the D flip-flop 40. In this case, the output signal of the switching circuit 30 is delayed by the clear signal generator 25 in such manner that the counter 21 is cleared by the signal SFX or SFG after the latch of the output $N_o$ to the D flip-flop circuit 40 is completed.

In response to the output of the D flip-flop circuit 40, the pull-in operation of the linear velocity, the velocity servo and further the asymmetry correction are carried out.

Reference 60 designates generally a system for the pull-in operation of the constant linear velocity and the velocity servo, while reference 70 designates generally a system for the asymmetry correction. These systems 60 and 70 include up-down counters 61, 71 and output processing circuits (digital-to-analog converters) 62, 72 for converting the counted value outputs from the former in digital-to-analog fashion, respectively. The clock from a clock pulse generator 50 is supplied to up-count terminals U or down-count terminals D of the up-down counters 61 and 71 in accordance with the output of the D flip-flop circuit 40, respectively.

Speaking more precisely, the clock pulse generator 50 is supplied with the output signal $S_w$ of the frequency divider 31A, from which a pulse $P_U$ is derived at each period where this signal $S_w$ is "1" and a pulse $P_D$ is derived during each period where the signal $S_w$ is "0".

The pulse $P_U$ is supplied to the up-count terminal U of the up-down counter 71 by way of a gate circuit 73, while the pulse $P_D$ is supplied to the down-count terminal D of the up-down counter 71 by way of a gate circuit 74. Moreover, the pulse $P_D$ is supplied through a gate circuit 63 and a change-over circuit 64 to the up-count terminal U of the up-down counter 61, and is further supplied through the gate circuit 74 and the change-over circuit 64 to the down-count terminal D of the up-down counter 61. Then, if a Q output VS of the D flip-flop circuit 40 is "1", the gate circuits 73 and 74 are opened, and if a $\overline{Q}$ output $\overline{VS}$ thereof is "1", the gate circuit 63 is opened.

The voltage from the output processing circuit 62 is supplied to a level comparator 7 so as to develop an output signal at an output terminal 8 thereby driving a disc driving motor M, while from the output processing circuit 72 is developed a threshold voltage $V_T$ to be supplied to the comparator 3 for use in waveform conversion.

The change-over circuit 64 serves to switch the velocity servo system 60 to the phase servo system after the disc D is pulled into the constant linear velocity, which is supplied with a pulse signal $3f_x$ (FIG. 3A) with a frequency three times the frame frequency provided by frequency-dividing the output of the quartz oscillator 28 at a frequency divider 65 and a pulse signal $3f_p$ (FIG. 3B) with a frequency three times the frequency of the frame sync signal provided by frequency-dividing the output of, for example, the PLL circuit at the frame sync signal detector 26. This change-over circuit 64 is switched so as to select either of the outputs of the gate circuits 63 and 74 by the output $D_{FS}$ of the frame sync signal existence detector 32 until the disc rotation is pulled into the constant linear velocity. After the disc rotation is pulled into the constant linear velocity, the change-over circuit 64 is switched so as to select either of the signals $3f_x$ and $3f_p$. In the state under which the signals $3f_x$ and $3f_p$ are selected by the change-over circuit 64, the counter 61 is supplied at its up-count terminal U with the signal $3f_x$ and is also supplied at the down-count terminal D thereof with the signal $3f_p$. Then, an output $S_L$ of the least significant bit derived from the counter 61 becomes such a signal that turns to "1" at each supply of the signal $3f_x$ and turns to "0" at each supply of the signal $3f_p$. In other words, the signal $S_L$ is equal in period to the signal $3f_x$ and the duty ratio thereof corresponds to the phase difference between the signals $3f_x$ and $3f_p$. Since the upper bits more than this do not change, the motor M is supplied with a voltage changing in response to a pulse width of the least significant bit thereby controlled. That is, the phase servo becomes operable for the motor M.

Next, the description of the embodiment of FIG. 1 will proceed further, in which the process until the disc D is pulled into the constant linear velocity will be discussed.

Until the disc D is pulled into the constant linear velocity, the output $D_{FS}$ of the frame sync signal existence detector 32 is "0" so that the switching circuit 30 provides the output signal SFX (FIG. 2H) of the frequency divider 29. Therefore, the output $S_w$ of the frequency divider 31A becomes a signal $S_{w1}$ which repeats "1" and "0" one after another at every one frame period as shown in FIG. 2I. Whereas, the switching circuit 23 produces the signal $S_o'$ during one frame period FA where this signal $S_{w1}$ is "1" and the signal $\overline{S_o}$ during one frame period FB where this signal $S_{w1}$ is "0".

In this case, the signal SFX is the positive pulse signal with the fairly fine pulse width so that the clear signal generator 25 provides the signal $\overline{S_o}$ as it is during the period FA and the signal $S_o$ as it is during the period FB. Thus during the period FA, the length of the transition interval of the positive polarity in the reproduced signal and during the period FB, the length of the transission interval of the negative polarity thereof are detected over successive one frame period thereof, respectively.

During each of the frame periods FA and FB, the counter 21 produces the output $N_o$ which becomes "0" if there exists any longer transition interval than the maximum transition interval 5.5 T where the linear velocity of the disc D is the predetermined one, namely, if the linear velocity of the disc D is slow. Therefore, while the velocity of the disc rotation is slow until the disc D is pulled into the constant linear velocity, the Q output VS of the D flip-flop circuit 40 is "0" and the $\overline{Q}$ output $\overline{VS}$ thereof is "1" thus forcing only the gate circuit 63 to be opened. At this time, the change-over circuit 64 is put into such a state by the output $D_{FS}$ of the frame sync signal existence detector 32 as to select the output signals of the gate circuits 63 and 74. Accordingly, although the clock generator 50 generates a pulse $P_U$ (FIG. 2J) at the beginning of the period FA and a pulse $P_D$ (FIG. 2K) at the beginning of the period FB, the pulse $P_D$ is supplied to the up-count terminal U of the up-down counter 61 by way of the gate circuit 63 and the change-over circuit 64 so as to increase its count value. Consequently, a voltage increasing gradually is derived from the output processing circuit 62 and then supplied to the level comparator 7 so that the voltage applied to the motor M is increased to allow the rotational velocity of the motor M to be increased.

Since under this state, the gate circuits 73 and 74 are closed, the counter 71 of the asymmetry correction system 70 is not supplied with up or down clock and a voltage corresponding to a previously set count value is derived from the output processing circuit 72 and is employed as the threshold voltage $V_T$.

When the rotational velocity of the motor M is increased to reach substantially the predetermined linear velocity, the maximum transition interval $T_{max}$ of the signal $S_o$ to $\overline{S_o}$ becomes nearly 5.5 T so that in association with the detection accuracy of the counter 21, the maximum transition intervals which are longer and shorter than 5.5 T appear, so the output $N_o$ of the counter 21 becomes "1" as well as "0". In other words, when the maximum transition interval $T_{max}$ is shorter than 5.5 T, that is, the velocity is somewhat faster than the predetermined value, the output $N_o$ becomes "1" so that the Q output VS of the D flip-flop circuit 40 becomes "1", while the $\overline{Q}$ output $\overline{VS}$ thereof becomes "0". At this time, the gate circuit 74 is opened to allow the clock pulse $P_D$ derived from the clock generator 50 to be supplied therethrough and the change-over switch 64 to the down-count terminal D of the up-down counter 61 resulting in the decrease of its count value. Therefore, the output voltage of the output processing circuit 62 is lowered so as to decrease the rotational velocity of the motor M.

When the lengths of the intervals where the Q output VS of the D flip-flop circuit 40 is "1" and "0" are equal to each other in view of the time constant of the output processing circuit 62, the count value of the up-down counter 61 becomes substantially constant, so that the output processing circuit 62 produces the voltage corresponding to this count value to thereby rotate the disc D at the constant linear velocity.

At this time if the clock pulse $P_D$ or $P_U$ is derived from the clock generator 50 during the period where the Q output VS of the D flip-flop circuit 40 is "1", either the clock pulse $P_D$ or $P_U$ is supplied to the up or down counter terminal U or D of the up-down counter 71 since the gate circuits 73 and 74 are opened, whereby the asymmetry phenomenon will be corrected as will be described later.

After the disc rotation is pulled into the constant linear velocity as set forth above, the detecting signal SF from the frame sync signal detector 26 becomes "0" so as to turn the output $D_{FS}$ of the frame sync signal existence detector 32 to "1" so that the switching circuit 30 is switched to the position shown in the figure, from which the signal SFG is derived. Also, the change-over circuit 64 is switched to the state by this output $D_{FS}$ so as to select either of the signals $3f_x$ and $3f_p$, whereby the phase servo mentioned before is applied to the motor M.

Since under this state, the change-over circuit 64 is changed over into the state to select either of the signals $3f_x$ and $3f_p$, the counter 21 acts as a transition interval detection circuit or detector of the asymmetry correction system 70. The signal SFG derived at this time from the switching circuit 30 contains an information of the interval through which the frame sync signal exists. Accordingly, this example so utilizes the above signal SFG that the counter 21 detects the transition interval only near the frame sync signal portion, namely, the nearby portion in which the parts of the positive and negative polarities of the maximum transition intervals $T_{max}$ are successive. Therefore, in this case, the correction of the asymmetry is performed so as to make the ON/OFF ratio of the maximum transition interval $T_{max}$ of the frame sync signal portion in the reproduced signal equal to 50%.

While the reproduced signal has the maximum transition interval $T_{max}$ in other periods in addition to the above frame sync signal portion, the asymmetry is corrected only in the portion of the frame sync signal as stated above. The reason for this is as follows.

Other than the frame sync signal interval, the maximum transition interval $T_{max}$ is included in other intervals, which will take place at random. On the other hand, in case of a reproducing apparatus of a PCM audio disc, the correction of the asymmetry is generally performed together with the velocity servo of the disc, in which the rotational velocity of the disc is varied every moment even during one frame period. Accordingly, in association with the above, the maximum transition interval $T_{max}$ which will take place at random is fluctuated so that unless the ON/OFF ratio of the signal at the specified position is not compared with one another, the judgement of the accurate ON/OFF ratio is impossible.

Furthermore, if the ON/OFF ratio of the signal is compared in the interval other than the frame sync signal, when the long transition interval is brought about by a scratch on the disc, the influence set by the above long transition interval makes the accurate correction of the asymmetry impossible. This is also considered in this embodiment.

The correction of the asymmetry will be described hereinafter.

The signal SFG (FIG. 2C) derived from the switching circuit 30 is supplied to the clear signal generator 25 and the frequency divider 31A. Since the signal SFG is coincient in period with the frame sync signal in the reproduced signal, the output signal $S_w$ derived from the frequency divider 31A becomes a signal $S_{w2}$ which as shown in FIG. 2D repeats "1" and "0" alternately at every one frame sync period which is supplied to the switching circuit 23, so that the switching circuit 23 produces the signal $S_o$ during one frame sync period TA where the signal $S_{w2}$ becomes "1" and the signal $\overline{S_o}$ during one frame sync period TB where the signal $S_{w2}$ becomes "0". Also, the output clocks $P_U$ and $P_D$ of the clock generator 50 are respectively derived as shown in FIGS. 2E and 2F at the beginning of each of the one frame sync periods TA and TB.

Whereas, within each one frame sync period, the clear signal generator 25 directly produces the signal $S_o$ or $\overline{S_o}$ supplied through the switching circuit 23 during the period $T_{FS}$ including the frame sync signal portion where the signal SFG is "0", and during other periods where the signal SFG is "1", the clear signal generator 25 provides a clear signal which always becomes "0". This clear signal is supplied to the clear terminal CL of the counter 21 so that the counter 21 detects whether the maximum transition interval $T_{max}$ of the frame sync signal developed during this period $T_{FS}$ is shorter or longer than 5.5 T. During the period TA where the signal $S_o$ is derived from the switching circuit 23, the counter 21 detects the maximum transition interval $T_{max}$ of the positive polarity, while during the period TB where the signal $\overline{S_o}$ is derived from the switching circuit 23, the counter 21 detects the maximum transition interval $T_{max}$ of the negative polarity.

Besides, the detected output $N_o$ of the counter 21 is latched in the D flip-flop circuit 40 by the rising-up of the signal SFG so that the Q output VS and $\overline{Q}$ output $\overline{VS}$ of the D flip-flop circuit 40 are respectvely updated at each end of the periods $T_{FS}$ as shown in FIG. 2G.

For instance, during the period TA where the maximum transition interval $T_{max}$ of the positive polarity is detected, if the length of the maximum transition interval $T_{max}$ of the positive polarity in the signal $S_o$ is shorter than 5.5 T, the output $N_o$ of the counter 21 is "1" so that as shown in FIG. 2G, the Q output VS of the D flip-flop circuit 40 keeps "1" from the end of the period $T_{FS}$ within the period TA to the end of the period $T_{FS}$ within the following period TB. Then, while driving this period, the gate circuits 73 and 74 are opened, only the pulse $P_D$ is derived from the clock pulse generator 50 during this period, which is then supplied to the down-count terminal D of the counter 71 via the gate circuit 74 thus resulting in the decreases of the count value of the counter 71 and the value of the comparing threshold voltage $V_T$.

Since the length of the maximum transition interval $T_{max}$ of the positive polarity is shortened when as shown in FIG. 4, the comparing threshold voltage $V_T$ changes to a voltage $V_{TU}$ which is higher than a voltage $V_{TO}$ in the absence of the asymmetry, the value of the comparing threshold voltage $V_T$ is decreased and corrected so as to change the voltage $V_{TU}$ into the correct voltage $V_{TO}$ as described above.

On the other hand, during the period TB where the length of the maximum transition interval $T_{max}$ of the negative polarity is detected, if the length of the maximum transition interval $T_{max}$ of the negative polarity in the signal $S_o$ is shorter than 5.5 T, the output $N_o$ of the counter 21 also becomes "1". But, at this time, the Q output VS of the D flip-flop circuit 40 holds "1" from the end of the period $T_{FS}$ within the period TB to the end of the period $T_{FS}$ within the following period TA (polarity of which becomes the opposite polarity to that of FIG. 2G). Then, since during this period, only the pulse $P_U$ is derived from the clock pulse generator 50, this pulse $P_U$ is supplied to the up-count terminal U of the counter 71 through the gate circuit 73, whereby its count value is increased to allow the value of the comparing threshold voltage $V_T$ to be increased.

The length of the maximum transition interval $T_{max}$ of the negative polarity is shortened when the threshold voltage $V_T$ changes to a voltage $V_{TD}$ which is lower than the correct voltage $V_{TO}$ as is clear from FIG. 4. Therefore, as described above, the value of the voltage $V_T$ is increased so as to correct the voltage $V_{TD}$ to be the correct voltage $V_{TO}$.

When the disc is rotated stably at substantially the constant linear velocity as stated above, if the asymmetry phenomenon occurs at the output of the waveform converting circuit, in response to the detected outputs of the parts of the positive and negative polarities of the maximum transition intervals $T_{max}$ in the output of the waveform converting circuit, the up-down counter is counted up or counted down to permit the asymmetry phenomenon to be corrected.

Besides. when the phase servo is being applied by the signals $3f_x$ and $3f_p$ to the motor M and the rotational velocity of the motor M is appreciably fluctuated by the dropout and other reasons so that in the frame sync signal detector 26, the frame sync signal is not detected over more than successive 16 frame sync periods, the output $D_{FS}$ of the frame sync signal existence detector 32 becomes "0" to permit the change-over circuit 64 to be switched to the state to select either of the output signals of the gate circuits 63 and 74. By the Q output VS and the $\overline{Q}$ output $\overline{VS}$ of the D flip-flop circuit 40 which are the latch outputs of the detecting output $N_o$ from the counter 21 to detect the maximum transition interval $T_{max}$, the up-clock or down-clock is properly supplied to the up-down counter 61 to apply the velocity servo rapidly so as to make the linear velocity as the predetermined velocity.

As the frame sync signal is detected, the output $D_{FS}$ of the frame sync signal existence detector 32 gets back to "1" so that the change-over circuit 64 is changed over into the state to make the phase servo operable.

An example of a practical arrangement of the apparatus of FIG. 1 as mentioned above is illustrated in FIG. 5.

In this example of FIG. 5, the detecting output $N_o$ of the counter 21 is derived through a NAND gate 21N, in which when the number of the clocks CP contained within the period where the maximum transition interval $T_{max}$ is 5.5 T is counted, all of the counted outputs of the predetermined bits become "1" so that the output $N_o$ of the NAND gate 21N becomes "0".

The clock generator 22 for generating the clock CP consists of a quartz oscillator 22A and a counter 22B to frequency-divide the output from the above quartz oscillator 22A. At the rising-up of the signal derived from the clear signal generator 25, the counter 22B is loaded with a predetermined value so that the beginning of the transition interval to be detected and the generation phase of the clocks CP derived from this counter 22B may always keep the constant relation therebetween.

The clear signal generator 25 consists of a NAND gate 25A and three inverters 25B, 25C and 25D. Each of the inverters 25B, 25C and 25D is used to delay the output signal derived from the switching circuit 30.

The switching circuit 23 consists of NAND gates 23A, 23B and an inverter 23C, in which the signal $S_o$ is supplied to the NAND gate 23A and the signal $\overline{S_o}$ is supplied to the NAND gate 23B, respectively. The signal $S_w$ derived from the frequency divider 31A is supplied directly to the NAND gate 23B, and is also supplied to the NAND gate 23A via the inverter 23C, respectively, whereby these NAND gates 23A and 23B are opened alternately. The output $N_o$ of the NAND gate 21N is supplied to these NAND gates 23A and 23B, whereby when the output $N_o$ becomes "0", these NAND gates 23A and 23B are closed so as not to pass the signals $S_o$ and $\overline{S_o}$ therethrough.

The switching circuits 30 consists of three NAND gates 30A, 30B and 30C, in which the NAND gate 30A is supplied with the signal SFX of the frame period and is controlled to open/close its gate by the output $D_{FS}$ of the frame sync signal existence detector 32, and the NAND gate 30B is supplied with the signal SFG of the frame sync frequency and is controlled to open/close its gate by the output signal $D_{FS}$ inverted by an inverter 32C.

The frequency dividers 31A and 31B are constructed, in this case, by one counter 31.

The frame sync signal existence detector 32 consists of a counter 32A and a NAND gate 32B. The signal SF is supplied to its reset terminal R of this counter 32A and to the NAND gate 32B, while a (1/16) frequency-divided output from the frequency-dividing counter 31 is supplied to the clock terminal CK of the counter 32A. When the frame sync signal detector 26 detects the frame sync signal, the signal SF is "0", so that the counter 32A is at the reset state and the output $D_{FS}$ of the NAND gate 32B turns to "1". Whereas, when the frame sync signal detector 26 does not detect the frame sync signal, the signal SF becomes "1" so that the counter 32A is put into the count possible state. So, as 16 frame sync periods have passed since the frame sync signal has not been detected, the (1/16) frequency-divided output of the counter 31A rises to "1", so that the output of the counter 32A becomes "1" and the output $D_{FS}$ of the NAND gate 32B becomes "0".

The circuit portion of the clock signal generator 50 for generating the clock pulse $P_D$ consists of three inverters 50A, 50B and 50C, each of which acts as a delay circuit, a NAND gate 50D and an inverter 50E. The signal $S_w$ and the signal, which is the signal $S_w$ delayed by the inverters 50A, 50B and 50C, are supplied together to the NAND gate 50D, so that the inverter 50E produces the pulse $P_D$ with the pulse width having delay times of three inverters 50A, 50B and 50C at the beginning of the period TA or FA. Also, the clock pulse $P_U$ generating circuit portion of the clock signal generator 50 consists of three inverters 50F, 50G and 50H, each of which functions similarly as a delay circuit, a NAND gate 50I and an inverter 50J. The output of the inverter 50C and an output, which is the output of the inverter 50C delayed by the inverters 50F, 50G and 50H, are supplied to the NAND gate 50I so that the inverter 50J provides a pulse $P_U$ with a pulse width having delay times of three inverters 50F, 50G and 50H at the beginning of the period TB or FB.

The gate circuits 63, 73 and 74 are all formed of NAND gates.

The change-over circuit 64 is comprised of NAND gates 64A, 64B, 64C, 64D, 64E and 64F, in which the NAND gate 64A is supplied with the signal $3f_x$ and the NAND gate 64B is supplied with the signal $3f_p$, respectively, while the output $D_{FS}$ of the frame sync signal existence detector 32 is supplied to the NAND gates 64A and 64B so as to open the same when the frame sync signal is detected stably. Moreover, the output of the NAND gate 63 is supplied to the NAND gate 64C and the output of the NAND gate 74 is supplied to the NAND gate 64D, respectively, while the output $D_{FS}$ inverted by the inverter 32C is supplied to the NAND gates 64C and 64D, whereby the NAND gates 64C and 64D are opened when the frame sync signal is not detected over successive 16 frame periods or over more than successive 16 frame periods.

The outputs from the NAND gates 64A and 64C are supplied to the NAND gate 64E whose output is supplied to the up-count terminal U of the up-down counter 61, while the outputs of the NAND gates 64B and 64D are supplied to the NAND gate 64F whose output is supplied to the down-count terminal D of the up-down counter 61, respectively.

In this example, this counter 61 is of a 4-bit counter, and in the output processing circuit 62 the counted outputs of upper 3 bits of the counted outputs of 4 bits derived from the counter 61 are D/A (digital-to-analog) converted by resistors 62A, 62B and 62C, each one end of which is connected to one another. The counted output of the least significant bit of the counter 61 is added through a NAND gate 62F, an inverter 62G and a resistor 62H to the above output D/A converted and is employed for the phase servo.

In this case, when the full count state is brought about by the up-count in the up-down counter 61 or the zero count state is brought about by the down-count therein, if the up-count and down-count operations are not stopped, this leads to the misoperation of the servo circuit. Therefore, the outputs of the NAND gates 62D and 62E, each being supplied with the counted outputs of the upper 3 bits are respectively supplied to the NAND gates 64E and 64F so as to close the same when the full-count and zero-count states take place in the counter 61.

The up-down counter 71 is similarly of a 4-bit counter, in which its counted outputs of upper 3 bits are D/A-converted by resistors 72A, 72B and 72C of the output processing circuit 72 and become the threshold voltage $V_T$.

Besides, when the lock of the phase servo is made inoperable due to any other reason after especially the disc rotation is pulled into the constant linear velocity, and the disc is rotated stably at the constant linear velocity it is particularly considered that the phase servo is made OFF and the velocity servo is readily made operable so as to recover the stable state rapidly.

To be more concrete, in FIG. 5, reference 80 denotes a constant linear velocity pull-in lock circuit consisting of a D flip-flop circuit 80A, NAND gates 80B, 80C and inverters 80D, 80E, in which the output $D_{FS}$ of the frame sync signal existence detector 32 is supplied to the NAND gate 80B and a Q output of the D flip-flop circuit 80A is also supplied to the same. A D terminal of this flip-flop circuit 80A is made high level, while a clock terminal CK thereof is supplied with the (1/16) frequency-divided output from the frequency-dividing counter 31. The outputs of the NAND gates 62D and 62E are supplied to the NAND gate 80C whose output is supplied to a clear terminal CL of this D flip-flop circuit 80A via the inverter 80D.

The output of the NAND gate 80B is supplied to the phase servo NAND gate 62F, and is also supplied to the inverting input terminal of the level comparator 7 by way of the inverter 80E.

Accordingly, when the frame sync signal is provided and the output $D_{FS}$ is "1", if the up-down counter 61 is at neither the full count state nor the zero count state, the output of the inverter 80D is "1". Thus the D flip-flop circuit 80A is cleared to make its Q output "0" so that the output of the NAND gate 80B becomes "1" and the NAND gate 62F is opened to permit the phase servo circuit to become effective and the output of the inverter 80E whose level is equal to the comparing reference voltage of the level comparator 7 to become a low level.

On the other hand, in the state under which the output $D_{FS}$ is "1", when the up-down counter 61 is put into the full count or zero count state, that is, a so-called state under which the servo lock is invalid, the output of the NAND gate 80C becomes "1" and the output of the inverter 80D becomes "0" so that the (1/16) frequency-divided output of the counter 31 gives the clock to the D flip-flop circuit 80A so as to turn its Q output to "1". Then, the output of the NAND gate 80B becomes "0" so that the NAND gate 62F is closed and the signal to be supplied to the inverting input terminal of the level comparator 7 becomes high level to allow the velocity servo to become operable rapidly.

In addition, the reason why the counter 21 is reset especially by the signal SFX of the frame period derived from the quartz oscillator so as to detect the length of the transition interval by the frame period unit until the disc rotation is pulled into the constant linear velocity is stated below. If the frame sync period signal SFG is employed until the disc rotation is pulled into the constant linear velocity, when the frame sync signal is not detected, this signal SFG has the frequency remarkably higher than the frame period since it becomes the frequency-divided signal with the free-running frequency of the PLL circuit so that with respect to the reproduced signal with longer frame period, this signal SFG sometimes does not contain at its one period the maximum transition interval $T_{max}$, resulting in a fear that the disc rotation will not be pulled into the constant linear velocity.

As described above, the up-down counter is used, the transition intervals of the positive and negative polarities are detected in time sharing manner and the up-count operation of the counter is performed by one detected output and the down-count operation thereof is performed by the other detected output thus enabling the asymmetry to be corrected. In accordance with the invention, since the asymmetry is digitally corrected as seen in the above, such an effect is acheived that the accuracy of the correction can be increased.

Moreover, the maximum transition interval $T_{max}$ is detected only in the part of the data frame sync signal including the maximum transition interval $T_{max}$ so that such a defect as previously stated where the maximum transition interval $T_{max}$ is detected over the entire interval will not be caused. Besides, during the period through which the frame sync signal is not provided until the rotational velocity is pulled into the stable state, the maximum transition interval $T_{max}$ is detected by the unit of the frame period. Therefore, even if the velocity servo is effected by the use of the detected output of the maximum transition interval $T_{max}$, such a disadvantage will not occur that the velocity servo is not made effective.

In this case, when a signal repeating the minimum transition interval $T_{min}$ is employed as the data frame sync signal, it is needless to say that the minimum transition interval $T_{min}$ is detected by the counter 21 so as to correct the asymmetry thereof.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. An information reproducing apparatus comprising:
   a disc having recorded thereon an information signal which is modulated by a run length limited code;
   means for reproducing said information signal from said disc;
   a motor for rotating said disc;
   a comparator for comparing a level of said reproduced information signal with a threshold voltage to produce a continuous rectangular wave form signal;
   detecting means for detecting an interval of a positive polarity part of a transition interval in said rectangular wave form signal and an interval of a negative polarity part of the transition interval in said rectangular wave form signal;
   a clock pulse generating source;
   up-down counter means connected to said clock pulse generating source for counting clock pulses during a predetermined transition interval such that the content of said counter means changes in one direction when the interval of said positive polarity part is greater than said predetermined interval and that the content of said counter means changes in an opposite direction when the interval of said negative polarity part is greater than said predetermined interval; and
   a digital-to-analog (D/A) converter for converting a digital signal supplied from said up-down counter means to a corresponding analog signal fed to said comparator as said threshold voltage, thereby to produce a signal having equal intervals of positive and negative polarity parts in said transition interval.

2. An information signal reproducing apparatus according to claim 1, wherein said information signal recorded on said disc contains a frame synchronizing signal and further comprising means for deriving said frame synchronizing signal from said reproduced information signal, means for deriving a reference signal when said frame synchronizing signal is not derived from said reproduced information signal, switching means for selectively connecting one of said means for deriving said frame synchronizing signal or said means for deriving said reference signal to said detecting means for detecting a maximum or minimum transition interval of the reproduced signal.

3. An information signal reproducing apparatus according to claim 1, wherein said detecting means includes a counter connected to a second clock pulse generating source and being operable to count clock pulses therefrom only during the period of the transition interval of said reproduced signal, whereby said interval is detected.

4. An information signal reproducing apparatus according to claim 3 further comprising:
   second up-down counter means connected to said counter in said detecting means for counting down when the content of said counter is greater than a predetermined value and for counting up when the content is less than the predetermined value;
   a second digital-to-analog (D/A) converter for converting an output of said second up-down counter means to a corresponding analog signal; and
   a loop control circuit connected to said motor for controlling said disc rotation in response to the output of said second digital-to-analog (D/A) converter.

5. An information signal reproducing apparatus according to claim 4, in which said information signal recorded on said disc contains a frame synchronizing signal and further comprising:
   a second clock pulse generating source for supplying a clock signal to said second up-down counter means;
   means for generating a first pulsed reference signal of frequency higher than that of said frame synchronizing signal and a second pulsed reference signal of frequency higher than a frame frequency of the reproduced signal; and
   a selecting circuit for selectively supplying either said clock signal from said clock pulse generating source or said first pulsed reference signal or said second pulsed reference signal to said second up-down counter.

6. An information signal reproducing apparatus according to claim 5, further comprising means for deriving said frame synchronizing signal from said reproduced signal for feeding said frame synchronizing signal to said selecting circuit in which said clock signal is changed over into said first pulsed reference signal or said second pulsed reference signal when said frame synchronizing signal is derived therefrom.

7. An information signal reproducing apparatus according to claim 5, wherein said second up-down counter means includes upper and lower bits, said second up-down counter means is respectively supplied at a first directional count terminal with said first pulsed reference signal and at an opposite directional count terminal with said second pulsed reference signal so as to provide a velocity servo signal by the upper bit of the counted output of said second up-down counter and a phase servo signal by the least significant bit thereof.

8. Apparatus for use with a system for reproducing information from a disc having an information signal recorded thereon in run length limited code modulation, a motor for rotating the disc, a device for reproducing the recorded information signal, and a comparator for comparing the level of the reproduced signal to a threshold level to produce a continuous rectangular waveform signal, comprising:
 detecting means for measuring the length of a positive polarity portion of a maximum transition interval of said rectangular waveform signal and for detecting the length of a negative polarity portion of a maximum transition interval of said rectangular waveform and for producing an output signal representative of the detected lengths;
 comparison means connected to said output signal from said detecting means for determining whether said positive polarity portion is greater or less than a predetermined transition interval and for determining whether said negative polarity portion is greater or less than said predetermined transition interval and producing an output signal representative thereof;
 clock signal generator means for producing clock signals;
 up/down counter means receiving said clock signal and said output signal from said comparison means for counting clock pulses so that the contents of the counter are increased when the interval of said positive polarity portion is greater than said predetermined interval and counting said clock pulses such that the contents are decreased when the interval of said negative polarity portion is greater than said predetermined transition interval; and
 digital-to-analog convertor means connected to said up/down counter means for converting digital signals representing the contents thereof to a corresponding analog signal and said analog signal being fed to said comparator as said threshold level, thereby producing a signal having equal intervals of positive and negative polarity portions in said maximum transition interval.

9. Apparatus according to claim 8, in which said detecting means for measuring the lengths of positive and negative polarity portions of said maximum transition intervals comprises pulse counting means arranged to count clock pulses from said clock signal generator means and means for enabling said counter means only during said maximum transition interval of said rectangular waveform signal.

10. Apparatus according to claim 9, further comprising second up/down counter means connected to said pulse counting means for counting down when the content of said pulse counting means is greater than a predetermined value and for counting up when the content of said pulse counting means is less than a predetermined value;
 second digital-to-analog convertor means for converting an output of said second up/down counter means to a corresponding analog signal; and
 a motor control loop for connecting said analog signal from said second digital-to-analog convertor means to said motor, whereby said disc rotation is further controlled in response thereto.

11. Apparatus according to claim 10, in which said clock signal generator means produces a clock signal fed to said second up/down counter means;
 means for generating a first pulsed reference signal of frequency higher than that of said frame synchronizing signal and a second pulsed reference signal of frequency higher than a frame frequency of said reproduced signal; and
 means for selectively connecting either of the signals from said clock signal generator or said means for generating said first and second pulsed reference signals to said second up/down counter means.

12. Apparatus according to claim 8, in which said information signal recorded on said disc includes a frame synchronizing signal and further comprising means for deriving said frame synchronizing signal from a reproduced information signal, means for producing a reference signal when said frame synchronizing signal is not derived from said reproduced signal, switch means for selectively connecting one of said means for deriving said frame synchronizing signal or said means for producing said reference signal to said detecting means, whereby a maximum transition interval of the reproduced signal is detected.

* * * * *